UNITED STATES PATENT OFFICE.

JOSEF MESSINGER AND GEORG VORTMANN, OF AIX-LA-CHAPELLE, GERMANY, ASSIGNORS, BY MESNE ASSIGNMENTS, TO EDWARD N. DICKERSON, OF NEW YORK, N. Y.

COMPOUND OF IODINE WITH THYMOL.

SPECIFICATION forming part of Letters Patent No. 446,875, dated February 24, 1891.

Application filed February 5, 1890. Serial No. 339,320. (Specimens.) Patented in Germany March 9, 1889, No. 49,739, and in England March 23, 1889, No. 5,079.

*To all whom it may concern:*

Be it known that we, JOSEF MESSINGER and GEORG VORTMANN, chemists, residing at Aix-la-Chapelle, Germany, subjects of the Emperor of Austria, have invented a new and useful Improvement in the Manufacture of a New Pharmaceutical Product, (for which we have already obtained Letters Patent in Germany, No. 49,739, dated March 9, 1889, and in Great Britain, No. 5,079, on the 23d of March, 1889,) of which the following is a specification.

Our invention relates to the manufacture of a new iodine substitution product of thymol. This new medicinal preparation is applicable as a substitute for iodoform wherever the same has been hitherto used in medical practice. It is, however, much superior to that, being odorless and having a higher specific action in numerous skin diseases.

We proceed as follows: 1.5 kilos, by weight, of thymol are dissolved in ten liters of water, under addition of 0.8 kilos, by weight, of soda-lye, and to the clear liquor a solution of 5.08 kilos, by weight, of iodine in 6.5 kilos, by weight, of an alkaline iodide is added, under continuous stirring at a temperature of about 15° centigrade. A dark-red voluminous amorphous precipitate is immediately formed, which represents the new iodine substitution product of thymol. This product likewise results if an alkaline solution of 1.5 kilos, by weight, of thymol is mixed with a solution of 2.3 kilos of sodium iodide and a solution of an alkaline hypochloride.

The precipitate is separated by filtration, carefully washed with clear water, and dried at ordinary temperature. It has the following characteristics: It represents an amorphous odorless powder of a brown-red color, is insoluble in water, difficultly soluble in alcohol, more easy in ether, and easily in oil, melting at about 110° centigrade under decomposition. It is insoluble in alkali, and therefore represents an iodine substitution product of thymol, in which the hydrogen of the hydroxylic group of thymol is substituted by iodine. This is the cause why our new product is extremely changeable and is easily converted into a colorless hitherto unknown iodine substitution product of thymol by heating it direct or with a solution of hyposulphite. It differs very materially from the substance which is described by Willgerodt and Kornblum, *Jornal fur Praktische Chemie*, (2) 39, p. 289 298, because in the latter the hydrogen of the hydroxyl group of the thymol is not substituted by iodine, and therefore the body is soluble in alkali, while the product here described, on account of the hydrogen being substituted by iodine in the hydroxyl group, is insoluble in alkali.

We do not herein claim the process by which the article is made, as that is the subject-matter of our application, Serial No. 342,642.

Having thus described the nature of our invention and in what manner the same is to be executed, what we claim as new, and desire to secure by Letters Patent, is—

The new iodine substitution product of thymol, which is an amorphous odorless powder of a brown-red color, insoluble in water and alkali and difficultly soluble in alcohol, more easy in ether, and easily in oil, melting at about 110° centigrade under decomposition, substantially as described:

In testimony whereof we have signed our names in the presence of two subscribing witnesses.

JOSEF MESSINGER.
GEORG VORTMANN.

Witnesses:
JOHN HAKMANNS,
ANDREW RINGER.